United States Patent
Zhang et al.

(10) Patent No.: US 10,447,551 B1
(45) Date of Patent: Oct. 15, 2019

(54) METHOD AND SYSTEM FOR AUTONOMOUS DISCOVERY OF COLORED INTERFACE MAPPINGS ACROSS ROUTING AND OPTICAL LAYERS

(71) Applicant: Cisco Technology, Inc., San Jose, CA (US)

(72) Inventors: Randy Hehui Zhang, Plano, TX (US); Rajiv Asati, Morrisville, NC (US); Gabriele Maria Galimberti, Bovisio Masciago (IT); Errol Fenton Roberts, Ardsley, NY (US); Walid Wakim, Plainfield, IL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/203,930

(22) Filed: Nov. 29, 2018

(51) Int. Cl.
*H04L 12/24* (2006.01)
*H04J 14/02* (2006.01)

(52) U.S. Cl.
CPC .......... *H04L 41/12* (2013.01); *H04J 14/021* (2013.01); *H04J 14/0221* (2013.01); *H04J 14/0257* (2013.01); *H04J 14/0267* (2013.01)

(58) Field of Classification Search
CPC ..... H04L 41/12; H04J 14/021; H04J 14/0221; H04J 14/0257; H04J 14/0267
USPC ........................................................ 398/83
See application file for complete search history.

(56) References Cited

U.S. PATENT DOCUMENTS

| | | |
|---|---|---|
| 7,046,928 B1 | 5/2006 | Bradford et al. |
| 7,065,268 B2 | 6/2006 | Prairie et al. |
| 8,447,183 B2 | 5/2013 | Boduch et al. |
| 9,438,369 B2 * | 9/2016 | Swinkels ............ H04J 14/0257 |
| 9,911,305 B2 * | 3/2018 | Papakos ................ H04J 14/021 |
| 10,256,935 B1 * | 4/2019 | Kumar ................ H04J 14/0213 |
| 2013/0177311 A1 * | 7/2013 | Trnkus ................ H04J 14/0227 398/28 |
| 2015/0104170 A1 * | 4/2015 | Xia ..................... H04J 14/0202 398/48 |

(Continued)

OTHER PUBLICATIONS

Juniper Networks, Inc., "Juniper ADVA Packet Optical Convergence Reducing total cost of ownership in de-layered networks", ADVA Optical Networking, Oct. 2015, 18 pages.

(Continued)

*Primary Examiner* — Dalzid E Singh
(74) *Attorney, Agent, or Firm* — Edell, Shapiro & Finnan, LLC

(57) ABSTRACT

An interface mapping method includes obtaining, at a network controller, device information of network devices configured to be in communication with each other through an optical network. The network devices include a plurality of colored interfaces that support a range of wavelengths for communication in the optical network. Interface information of the colored interfaces of the network devices is obtained, and optical power information associated with each of the colored interfaces is obtained. Optical power margins for a transmitter interface of the colored interfaces. The transmitter interface is controlled to transmit a power sequence based on the optical power margins, and power readings are obtained from a receiver interface of the colored interfaces. A topology between the colored interfaces is discovered based on the power sequence and the power readings.

20 Claims, 10 Drawing Sheets

(56) References Cited

U.S. PATENT DOCUMENTS

2017/0093487 A1* 3/2017 Grammel .............. H04J 14/021
2018/0175962 A1* 6/2018 Magri ................. H04J 14/0212

OTHER PUBLICATIONS

Cisco, "Cisco WAN Automation Engine Software Release 6.2", PB735488, Jul. 31, 2015, 6 pages.

* cited by examiner

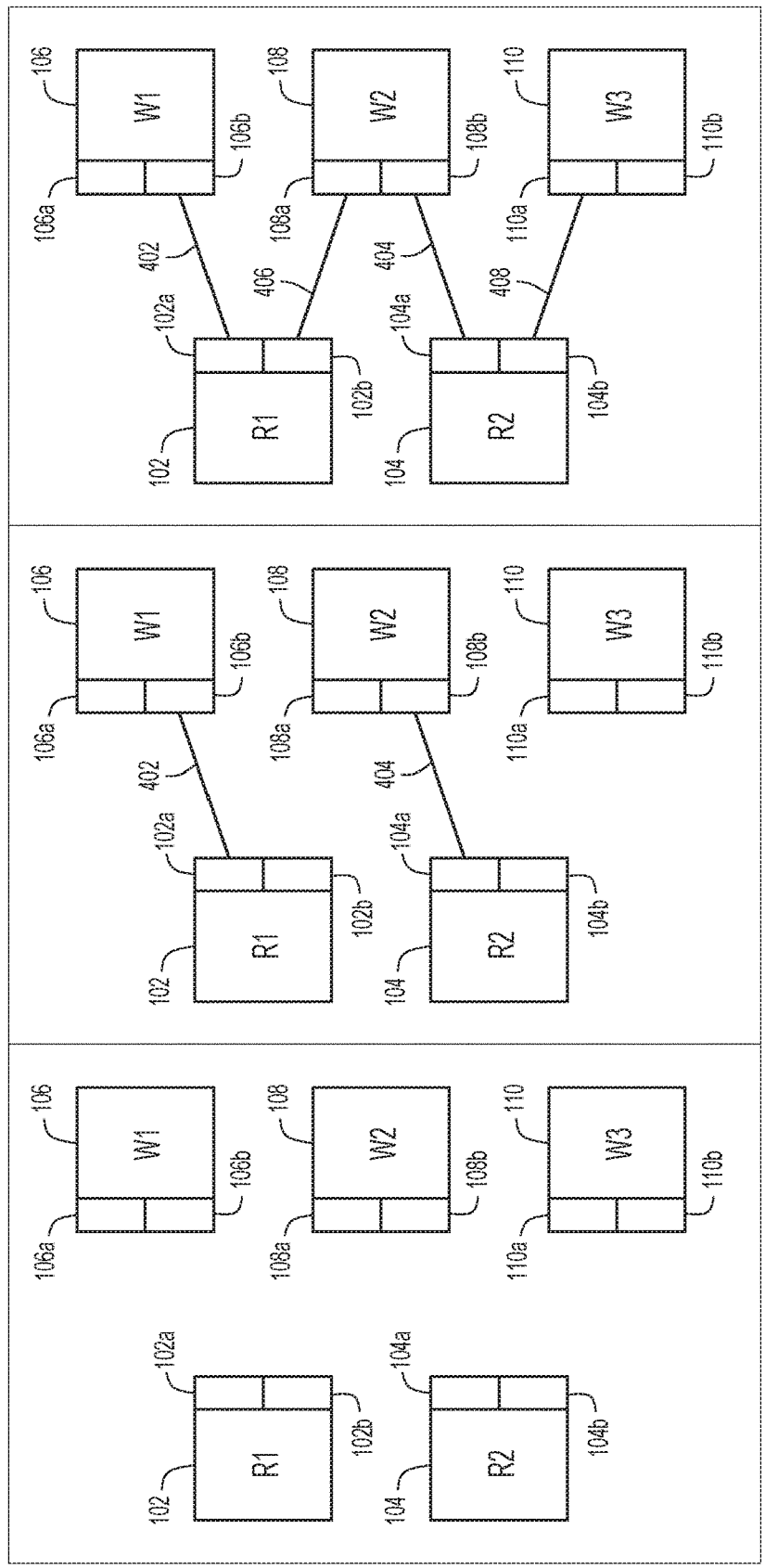

METHOD AND SYSTEM FOR AUTONOMOUS DISCOVERY OF COLORED INTERFACE MAPPINGS ACROSS ROUTING AND OPTICAL LAYERS

TECHNICAL FIELD

The present disclosure relates to techniques for discovering topology between colored interfaces of network devices across routing and optical layers.

BACKGROUND

The contemporary communications network is generally built with devices from multiple networking layers, such as a routing layer over an optical layer that includes Reconfigurable Optical Add/Drop Multiplexers (ROADM). These devices may come from one or more vendors. Each vendor or each layer may have its own discovery mechanisms or management tools. An example of cross-layer interface mapping includes discovering which router port (layer 3) is connected to which ROADM Add port (layer 0). Generally, cross-layer connections can be a grey router interface connecting to a transponder or a colored router interface connecting to a multiplexer or demultiplexer port of a ROADM. For grey interfaces, cross-layer mapping may be derived from interface statistics or protocol snooping on the transponder.

BRIEF DESCRIPTION OF THE DRAWINGS

FIGS. 4A-4C are diagrams showing cross-layer mappings between colored interfaces of optical network devices at different stages in a discovery process, according to an example embodiment.

DESCRIPTION OF EXAMPLE EMBODIMENTS

Overview

In one embodiment, a method for discovering topology in the optical network is provided. A network controller obtains device information of network devices configured to be in communication with each other through the optical network. The network devices include a plurality of colored interfaces that support a range of wavelengths for communication in the optical network. Interface information of the colored interfaces of the network devices is obtained, and optical power information associated with each of the colored interfaces is obtained. Optical power margins for a transmitter interface of the colored interfaces are computed. The transmitter interface is controlled to transmit a power sequence based on the optical power margins, and power readings are obtained from a receiver interface of the colored interfaces. A topology between the colored interfaces is discovered based on the power sequence and the power readings.

Example Embodiments

Techniques for cross-layer discovery of colored interfaces are presented herein. Mapping colored interfaces across multi-layers is challenging for several reasons. First, because no transponder is employed in colored interface communications, techniques using interface statistics correlation or protocol snooping that rely on a transponder are not available. Also, dynamic management plane protocol support is not yet widely accepted or implemented in the field. Static mapping does not scale and is error-prone, and is not able to reflect the true nature of changing networks. Moreover, proprietary vendor solutions do not work in a multi-vendor environment.

Techniques disclosed herein enable cross-layer discovery for colored network interfaces. These techniques are autonomous with little or no user intervention. In some embodiments, the techniques allow performing discovery for in-service interfaces without bringing down the interfaces, and can be applied to multi-vendor equipment including, for example, routers and Reconfigurable Optical Add/Drop Multiplexer (ROADM) nodes.

Figure 1:
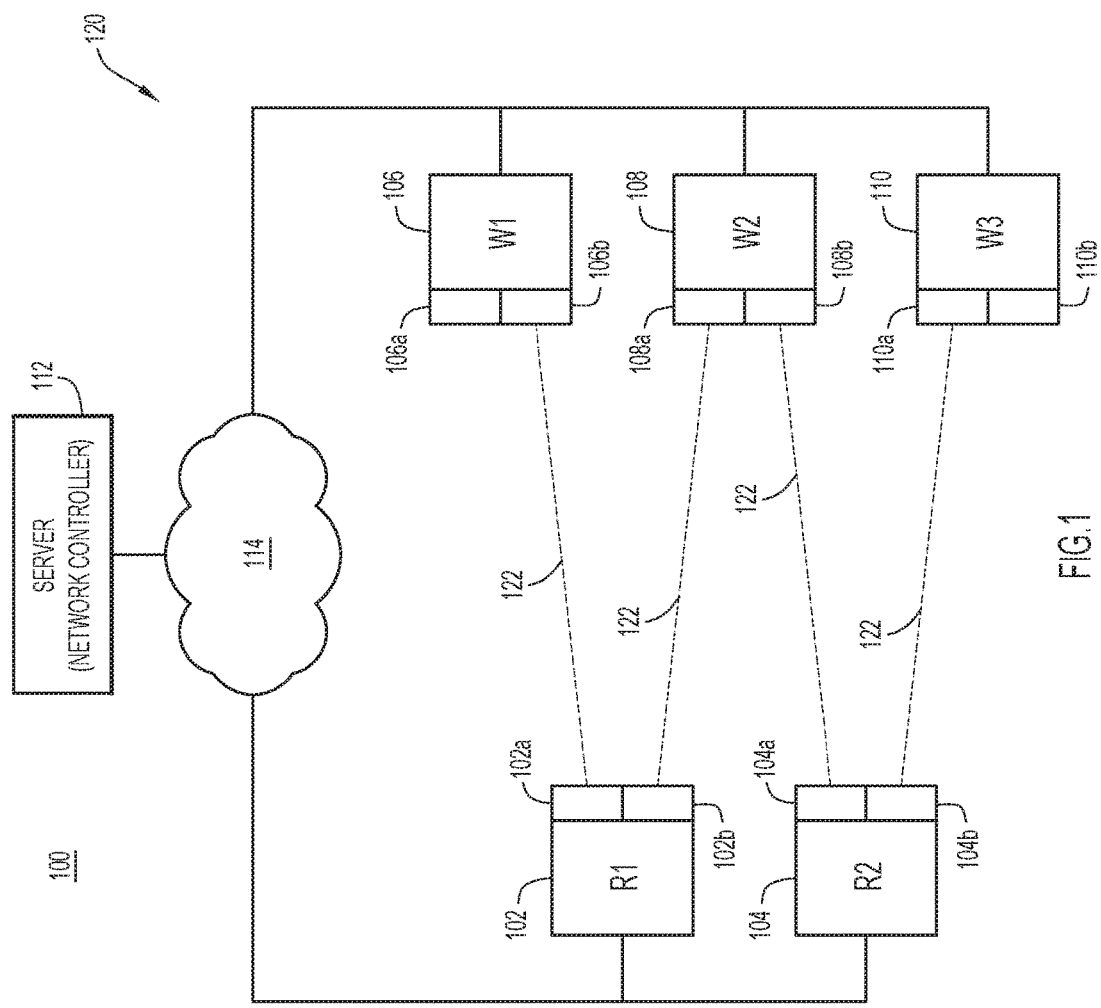
FIG. 1 illustrates a system for discovering topology between colored interfaces of network devices in an optical network, according to an example embodiment.

Example embodiments will be described with reference to the accompanying figures. Reference is first made to FIG. 1. FIG. 1 illustrates a system 100 for discovering topology between colored interfaces of network devices in an optical network, according to an example embodiment. The system 100 includes first-type optical network devices 102 (R1) and 104 (R2), second-type optical network devices 106 (W1), 108 (W2), and 110 (W3), and one or more servers/network controllers 112. These devices may be provided by the same or different vendors. The first-type and second-type optical network devices are devices of different layers. For example, the first-type optical network devices 102 and 104 may be layer 3 optical network devices, e.g., optical routers. The second-type optical network devices 106, 108, and 110 may be, for example, layer 0 optical network devices, e.g., optical multiplexers. Each of the first-type optical network devices 102 and 104 may include one or more colored interfaces. In the example shown in FIG. 1, the network device 102 includes two colored interfaces 102a and 102b while the network device 104 includes two colored interfaces 104a and 104b. In some embodiments, the second-type optical network devices 106, 108, and 110 are ROADM devices. Each of the optical network devices 106, 108, and 110 may include one or more interfaces. For example, the optical network device 106 includes two interfaces 106a and 106b; the optical network device 108 includes two interfaces 108a and 108b; and the optical network device 110 includes two interfaces 110a and 110b. The server 112 is connected, directly or through the network 114, to the optical network devices 102 and 104 and the optical network devices 106, 108, and 110. The server 112 is configured to control operations in the system 100 including operations for topology discovery among the interfaces. It is to be understood that the system 100 may include any number of first-type optical network devices, second-type optical network devices, and servers. In some embodiments, the system 100 may include more than two types of optical network devices. In some embodiments, an optical network device may be a multilayer network device.

The devices 102, 104, 106, 108 and 110 are part of an optical network 120. During the provisioning stage, the first-type optical network devices 102 and 104 are connected to the second-type optical network devices 106, 108, and 110 via optical cables 122, such as optical fiber cables, as a section of the optical network 120. The first-type optical network devices 102 and 104 and the second-type optical network devices 106, 108, and 110 communicate with each other through a range of wavelengths (colored wavelengths). However, at this point, the topology between the colored interfaces of the optical network devices 102 and 104 and the interfaces (physical ports) of the optical network devices 106, 108, and 110 has not been determined. Techniques are provided to map device interfaces across the layers by identifying the devices and interfaces.

Figure 2:
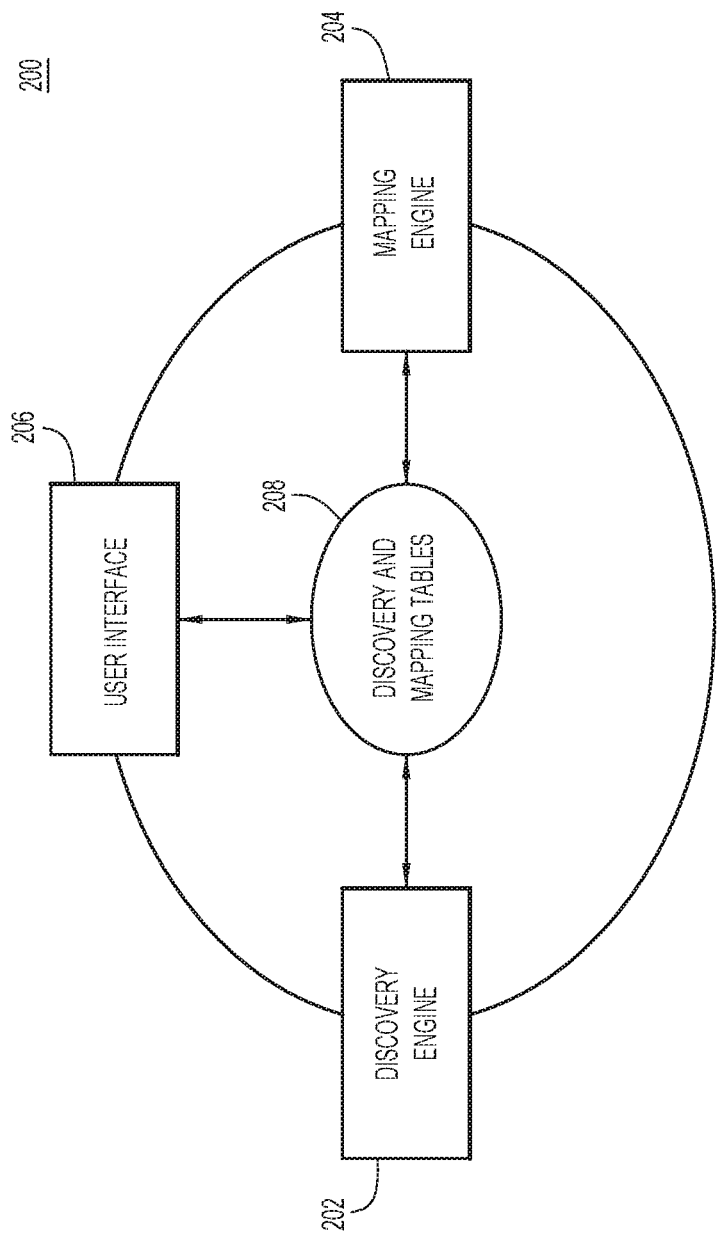
FIG. 2 is a functional diagram of a software process executable by one or more processors of a server to discover topology of network interfaces, according to an example embodiment.

The techniques are described with reference to FIG. 2. FIG. 2 is a diagram of a software process 200 executable by one or more processors of a server (e.g., server 112 in FIG. 1) to discover topology of network interfaces, according to an example embodiment. With reference to FIG. 2 and continued reference to FIG. 1, the server 112 is configured to execute the software process 200 to control the discovery of cross-layer interfaces. The software process 200 includes a discovery engine 202, a mapping engine 204, and a user interface 206. The discovery engine 202 performs discovery-related functions, including device, interface, and power information collection, information parsing, power sequence change, interface tagging for user acceptance to initiate discovery during a maintenance window, and safety margin computation. The mapping engine 204 performs interface mappings between layers. The discovery engine 202 and the mapping engine 204 in their respective operations generate discovery and mapping tables 208. The user interface 206 allows a user to approve/reject the discovery mechanism for tagged interfaces and customize power change policy. The operations in the discovery engine 202 and the mapping engine 204 are described hereinafter.

Figure 3A:
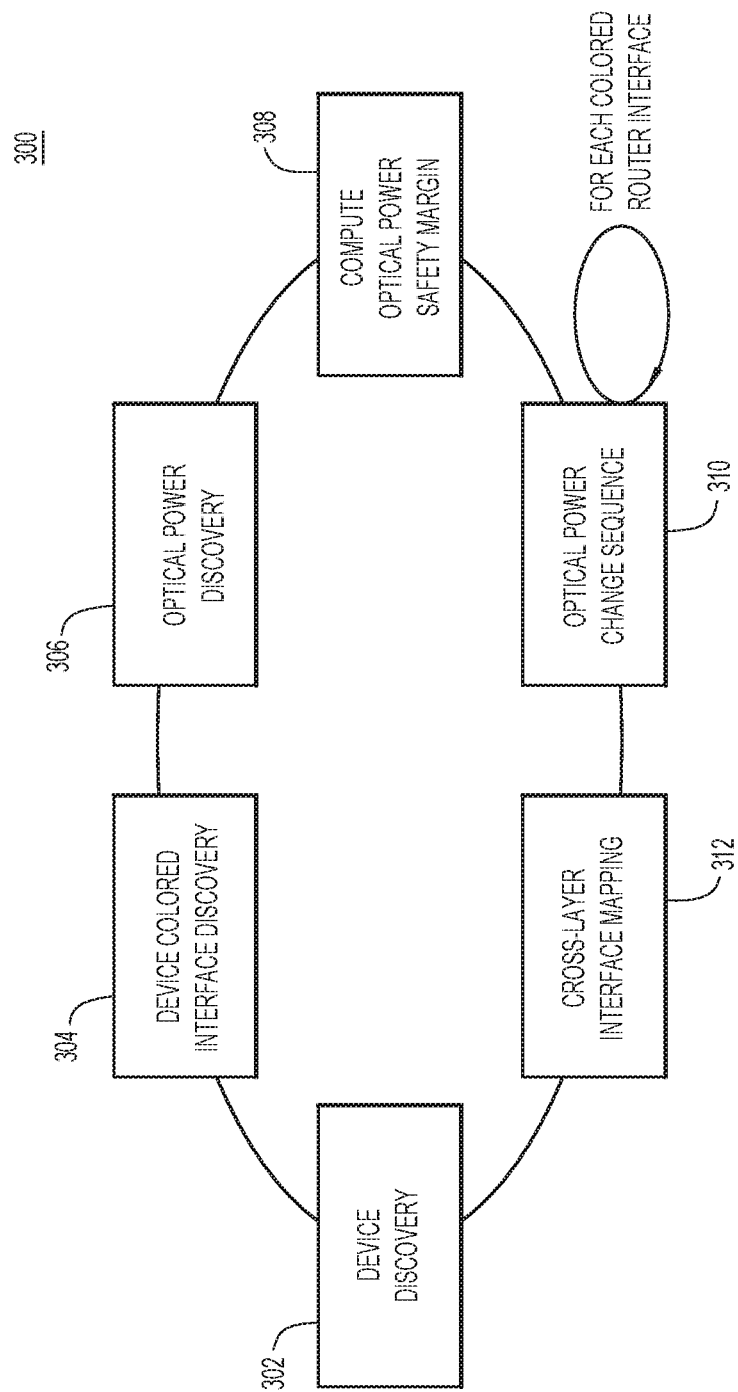
FIG. 3A is a flow diagram depicting a method for discovering topology of network interfaces, according to an example embodiment.

Reference is now made to FIG. 3A with continued reference to FIGS. 1 and 2. FIG. 3A is a flow diagram depicting a method 300 for discovering topology of network interfaces in a network environment such as that shown in FIG. 1, according to an example embodiment. For example, the method 300 may be performed by a server/network controller (e.g., server/network controller 112 in FIG. 1). At 302, the server 112 is configured to perform device discovery. For example, the server 112 may obtain for each of the first-type optical network devices 102 and 104 and the second-type optical network devices 106, 108, and 110, a seed file that includes a device Internet Protocol (IP) address and access credentials. The server 112 executes the discovery engine 202 to query the devices using one or more device discovery protocols, such as Simple Network Management Protocol (SNMP), Transaction Language 1 (TL1), command-line interface (CLI), model-driven telemetry, etc., to discover or confirm device types (e.g., routers or ROADMs) and basic device information, such as the device clock or time, and hardware and software information. Clocking conflict or inconsistency is resolved through, for example, converting the clocks of the devices to a universal time. In some embodiments, the user may choose to update the clock settings for the devices. The device information populates one or more device tables. An example device table is illustrated in Table 1 below.

TABLE 1

| Device name | Device IP address | Hardware | Software | Clock |
|---|---|---|---|---|
| Optical network device 102 | 192.10.15.1 | Processor Memory Physical ports | Routing software 1 | T1 |
| Optical network device 104 | 192.10.15.2 | Processor Memory Physical ports | Routing software 2 | T2 |
| Optical network device 106 | 192.10.20.1 | Processor Memory Physical ports | Multiplexing software 1 | T3 |
| Optical network device 106 | 192.10.20.2 | Processor Memory Physical ports | Multiplexing software 2 | T4 |
| Optical network device 108 | 192.10.20.3 | Processor Memory Physical ports | Multiplexing software 3 | T5 |

At 304, the server 112 is configured to perform interface discovery. For the devices discovered at 302, the server 112 further discovers interface types and states of the interfaces and generates one or more interface tables. In some embodiments, interface discovery can be triggered by a sequential process or any time that there is a new interface added to a device, through mechanisms such as SNMP traps, Syslog messages, or streaming telemetry. The server 112 is configured to identify the colored interfaces among the discovered interfaces. Further, for each colored interface, the server 112 is configured to identify its state. For example, a colored interface may be classified into one of three states: in-service, out-of-service, and out-of-provision. An in-service interface is functioning to carry traffic. In this state, the interface and its line protocol are both functioning. An out-of-service colored interface is an operationally down interface, either because the interface is not functioning and its line protocol is not functioning, or because the interface is functioning but its line protocol is not functioning. These out-of-service colored interfaces are supposed to carry traffic but are down at the moment due to operational conditions. An out-of-provision colored interface has not been provisioned. For example, out-of-provision colored interfaces are administratively down interfaces. These out-of-provision colored interfaces are not expected to carry traffic. An example interface table is shown in Table 2 below.

TABLE 2

| Device name | Interface ID | Gray or colored | State | Interface status | Line protocol status |
|---|---|---|---|---|---|
| Optical network device 102 | Interface 102a | Colored | In-service | Up | Up |
| Optical network | Interface 102b | Colored | In-service | Up | Up |

TABLE 2-continued

| Device name | Interface ID | Gray or colored | State | Interface status | Line protocol status |
|---|---|---|---|---|---|
| device 102 | | | | | |
| Optical network device 104 | Interface 104a | Colored | In-service | Up | Up |
| Optical network device 104 | Interface 104b | Colored | In-service | Up | Up |
| Optical network device 106 | Interface 106a | Colored | Out-of-service | Up | Down |
| Optical network device 106 | Interface 106b | Colored | In-service | Up | Up |
| Optical network device 108 | Interface 108a | Colored | In-service | Up | Up |
| Optical network device 108 | Interface 108b | Colored | In-service | Up | Up |
| Optical network device 110 | Interface 110a | Colored | In-service | Up | Up |
| Optical network device 110 | Interface 110b | Colored | Out-of-provision | Down | Down |

At 306, the server 112 is configured to obtain power readings/measurements including current readings at transmitter (Tx) interfaces and receiver (Rx) interfaces and their maximum and minimum readings from the colored interfaces on the devices discovered at 302. An account of wavelengths that are in use in the network is also collected. The obtained information populates an optical power table for the interfaces. An example optical power table is shown in Table 3 below.

TABLE 3

| Interface ID | Current Tx | Tx max | Tx min | Current Rx | Rx max | Rx min | Wave length |
|---|---|---|---|---|---|---|---|
| Interface 102a | | | | | | | |
| Interface 102b | | | | | | | |
| Interface 104a | | | | | | | |

At 308, the server 112 is configured to compute optical power safety margins for the interfaces. To discover the topology, the server 112 is configured to transmit a power sequence from a transmitter interface to a receiver interface in the optical network 120 while both the transmitter interface and the receiver interface are in-service. To ensure that the topology discovery can be performed while the interfaces are in-service, the power sequence is configured such that transmitting the power sequence would not disrupt the normal operation of the transmitter interface and receiving the power sequence would not disrupt the normal operation of the receiver interface. The optical power safety margins are computed for generating a suitable power sequence for topology discovery.

In some embodiments, the optical power safety margins include a Tx Power Change Safety Margin defined to be a power range for a colored interface of a device, e.g., router, in which a power change can be made to maintain the colored interface in-service. This is to ensure that a power change would not lead to service outage. In one embodiment, the Tx Power Change Safety Margin is computed for an in-service router interface. For example, the server 112 may compute the Tx Power Change Safety Margin based on the maximum power reading on a router interface and the minimum power reading in a ROADM interface and couple those readings with power change policy settings in the system to control how the power change in the power sequence takes place.

In some embodiments, a user may configure power change policy settings indicating a range limit of how much power can be changed while an interface is in-service. Any power change beyond the limit is to be performed in a maintenance window that would bring down the service in the optical network. In some embodiments, a power change sequence is a step sequence, and a user may set a desired step value for how much power can be changed at each step in the power change sequence.

Figure 3B:
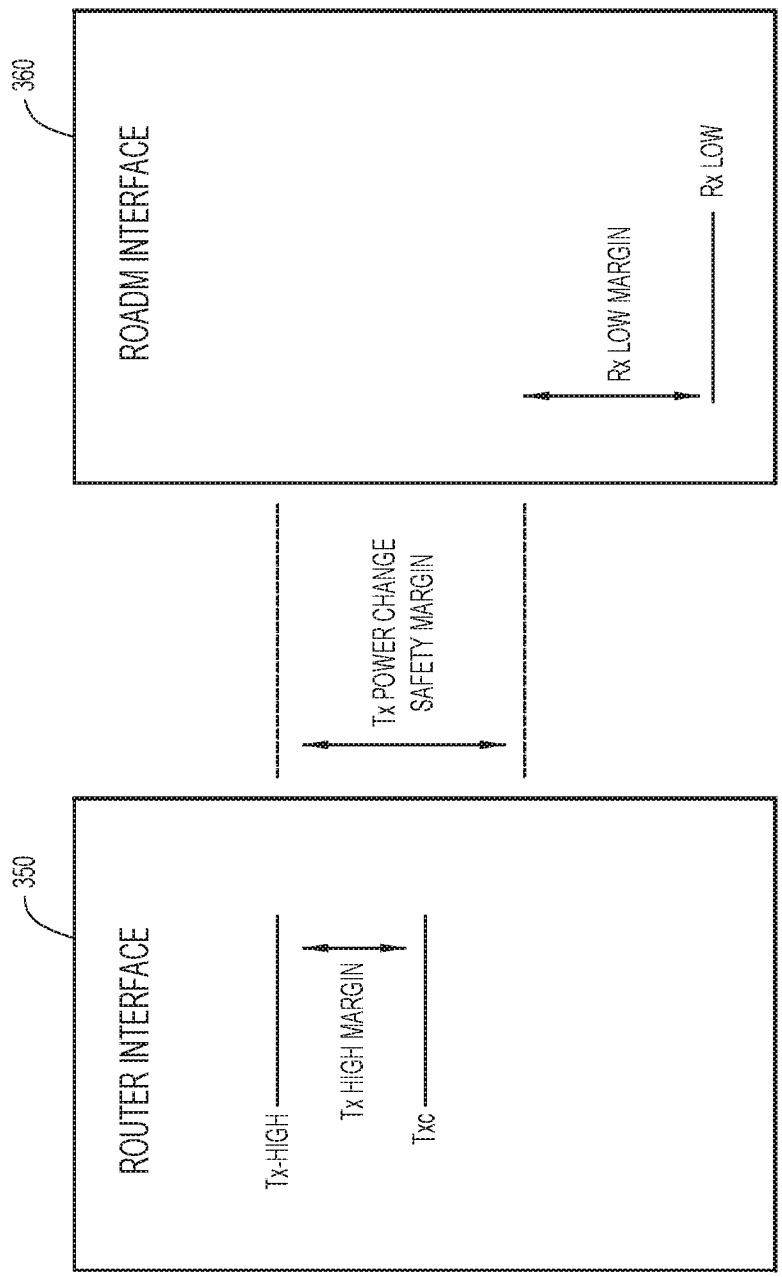
FIG. 3B is a diagram showing how optical power safety margins are computed, according to an example embodiment.

Reference is made to FIG. 3B. FIG. 3B is a schematic diagram showing how optical power safety margins are computed, according to an example embodiment. In FIG. 3B, a router interface 350 is functioning as a transmitter interface while a ROADM interface 360 is functioning as a receiver interface. Both the router interface 350 and the ROADM interface 360 are colored interfaces and are connected with each other through an optical cable (not shown). A server may obtain a maximum power reading (Tx-High) and a current power reading (Txc) of the transmitter interface 350 from an optical power table (e.g., Table 3). Based on the Tx High and the Txc, the server computes a transmitter high margin: Tx-HM=Tx-High−Txc, as an optical power safety margin.

In some embodiments, the server may obtain a minimum power reading (Rx Low) of the receiver interface 360 from the optical power table and a predetermined Rx Low Margin (Rx-LM). In some embodiments, the Rx Low is the minimum power reading of all nodes in the network. A user may set an Rx Low Margin for a network, which is a fixed amount of power margin (dB) above the Rx minimum reading (Rx Low) on the Rx port of an optical device, e.g., ROADM. The Rx Low Margin enables the receiver interface 360 to detect a signal from a power sequence transmitted from the transmitter interface 350. The server computes a transmitter power change safety margin: Tx-SM=Tx-High−(Rx Low+Rx-LM), as an optical power safety margin.

Referring back to FIG. 3A, at 310, the server 112 is configured to control a colored interface that has not been mapped to a corresponding interface (unmapped interface) to transmit a discovery power sequence for discovering the corresponding interface. The server 112 is further configured to collect power readings/measurements from the nodes in the network and store the power reading. Based on the power readings, at 312 the server is configured to perform cross-layer interface mapping and generate a mapping table that maps an interface of a device to a peer interface of a peer device. The operations 302-310 generate the device level information (device table), interface level information (interface table), and optical power information (optical power table). These tables are correlated with safety margin rules to generate the interface mapping table. For each interface, a mapping state is recorded. In some embodiments, a decision is reached for each interface whether the interface mapping is discovered and resolved. Any interface that is still undiscovered or unresolved is recorded as well and entered as inputs into the next iteration. An example mapping table is shown in Table 4 below.

TABLE 4

| Device | Device interface | Peer device | Peer interface |
|---|---|---|---|
| Optical network device 102 | Interface 102a | Optical network device 106 | Interface 106b |
| Optical network device 102 | Interface 102b | Optical network device 108 | Interface 108a |
| Optical network device 104 | Interface 104a | Optical network device 108 | Interface 108b |
| Optical network device 104 | Interface 104b | Optical network device 110 | Interface 110a |

FIGS. 4A-4C are diagrams showing cross-layer mappings between colored interfaces of optical network devices at different stages in a discovery process, according to one example embodiment. In FIG. 4A, the optical network devices 102 to 110 are deployed but the mappings among them have not been discovered. With continued reference to FIGS. 1 and 3A, after the server 112 performs operations 302-310, the server 112 controls the interfaces (102a, 102b, 104a, 104b) of the optical network devices 102 and 104 to transmit power sequences and collects power readings from interfaces (106a, 106b, 108a, 108b, 110a, 110b) of the optical network devices 106, 108, and 110. In some embodiments, after the server 112 performs the operation 312, some or all of the cross-layer connections between the interfaces can be discovered. For example, as shown in FIG. 4B, the server 112 discovers a connection 402 between the interface 102a of the first-type optical network device 102 and the interface 106b of the second-type optical network device 106, and a connection 404 between the interface 104a of the first-type optical network device 104 and the interface 108b of the second-type optical network device 108. The server 112 records the discovered mappings in an interface mapping table (e.g., Table 4). But the mappings for the interfaces 102b and 104b have not been discovered after operations 302-312. In some embodiments, the server 112 keeps track of undiscovered and unresolved interfaces and an iteration counter for those interfaces. The server 112 can reiterate operations 310 and 312 for those undiscovered and unresolved interfaces. For example, as shown in FIG. 4C, after the second iteration, the server 112 discovers a connection 406 between the interface 102b of the first-type optical network device 102 and the interface 108a of the second-type optical network device 108, and a connection 408 between the interface 104b of the first-type optical network device 104 and the interface 110a of the second-type optical network device 110. In some embodiments, after a predetermined number of iterations, still undiscovered and unresolved interfaces may be reported to the user for further investigation. These interfaces are marked lower in priority for the next discovery iteration.

Figure 5:
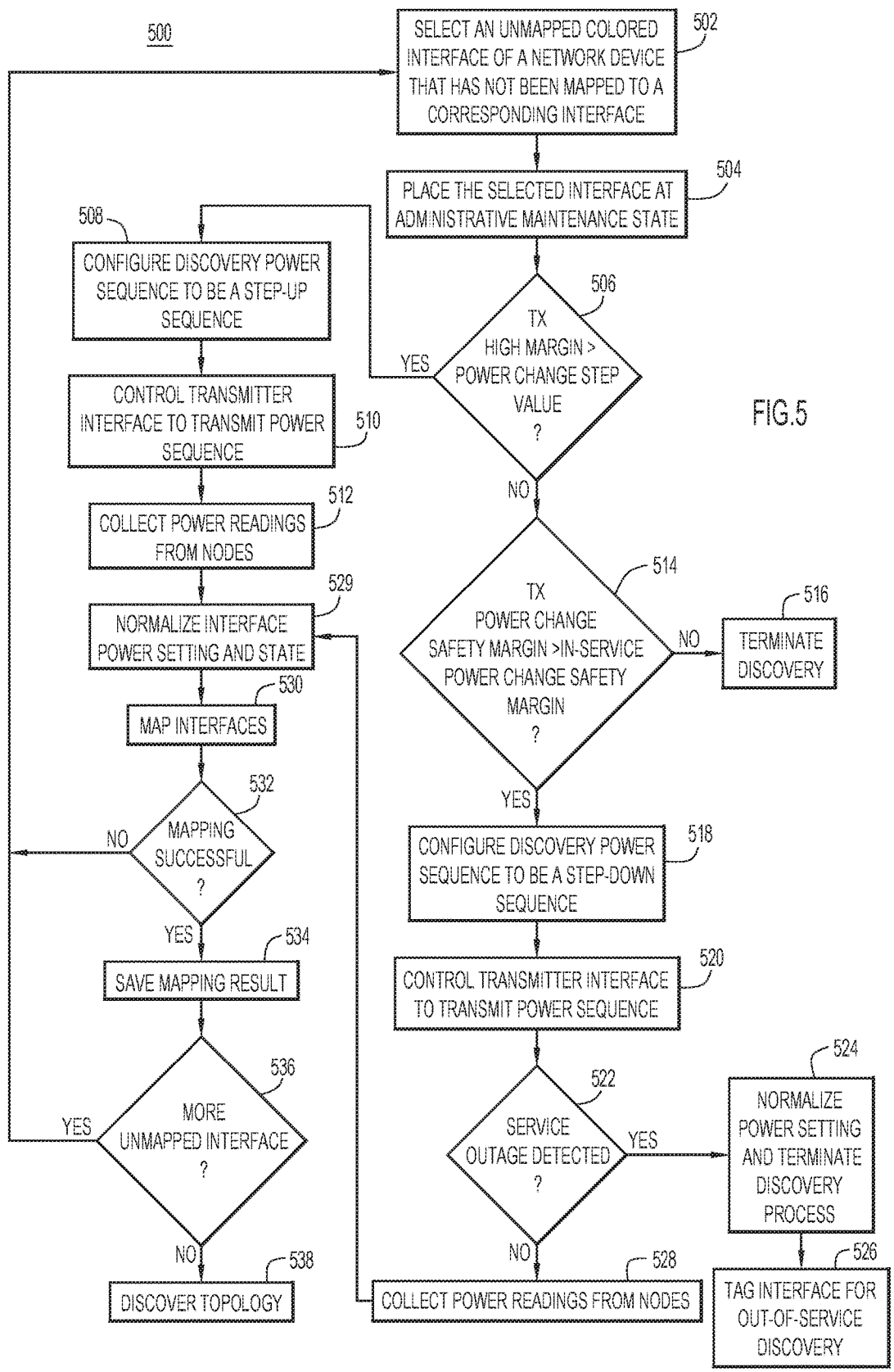
FIG. 5 is a flow chart illustrating a method performed by a server to control an unmapped transmitter interface to transmit a discovery power sequence and perform mapping of colored interfaces, according to an example embodiment.

Reference is made to FIG. 5. FIG. 5 is a flow chart illustrating a method 500 performed by a server, e.g., the server 112 in FIG. 1, to control an unmapped transmitter interface to transmit a discovery power sequence and perform mapping of colored interfaces as part of operations at 310 and 312 (FIG. 3A), according to an example embodiment. At 502, the server selects an unmapped colored interface of an optical network device, e.g., a router. For example, the server may examine an interface mapping table to determine if there is unmapped interfaces in the network managed by the server. This selected colored interface is used as a transmitter interface for transmitting a discovery power sequence in the network. At 504, the server places the selected interface at an administrative maintenance state, which allows the server to make power changes at the transmitter interface without bringing down the service, i.e., while the transmitter interface is in-service. At 506, the server determines whether the transmitter high margin (Tx High Margin) computed at 308 (FIG. 3A) for the unmapped interface is greater than or equal to a predetermined power change step value. In some embodiments, the predetermined power change step value is about 0.1-1 dB or 0.1-0.5 dB. This determination ensures that when the server controls the transmitter interface to increase its power from its current power value by the predetermined power change step value, the resulting power would not exceed the maximum power reading of the transmitter interface such that the power change would not disrupt the normal service at the transmitter interface.

If it is determined that the transmitter high margin is equal to or greater than the predetermined power change step value (Yes at 506), at 508 the server configures the discovery power sequence to be a step-up power sequence having a step value equal to the predetermined power change step value. At 510, the server controls the transmitter interface to transmit the step-up power sequence. For example, the server may control a laser at the transmitter interface to emit light to a connected optical cable according to the step-up power sequence. At 512, the server collects power readings from nodes in the network and saves the collected power readings in memory.

If it is determined that the transmitter high margin is less than the predetermined power change step value (No at 506), at 514 the server determines whether a transmitter power change safety margin computed at 308 (FIG. 3A) for the unmapped interface is greater than an in-service power change safety margin. The in-service power change safety margin is established such that a power change within the power change safety margin does not disrupt communications between the transmitter interface and the receiver interface. In response to determining that the transmitter power change safety margin for the unmapped interface is not greater than the in-service power change safety margin (No at 514), at 516 the server terminates discovery for the unmapped interface and tags the unmapped interface to be discovered in an out-of-service discovery process that would bring down the service in the network. In response to determining that the transmitter power change safety margin for the unmapped interface is greater than the in-service power change safety margin (Yes at 514), at 518 the server configures the power sequence to be a step-down power sequence. In some embodiments, a step value for the step-down power sequence is about 0.1-1 dB or 0.1-0.5 dB.

At 520, the server controls the transmitter interface to transmit the step-down power sequence. For example, the server may control a laser at the transmitter interface to emit light to a connected optical cable according to the step-down power sequence. At 522, the server determines whether a service outage is detected. For example, the server may detect a loss of signal on the receiver interfaces due to the power changes at the transmitter interface and determine that a service outage has occurred. In response determining that the service outage is detected, at 524, the server normalizes the power settings at the transmitter interface to restore the service and terminates discovery for the transmitter interface. At 526, the server tags the transmitter interface for an out-of-service discovery process that can be performed when the service in the network is turned off. In some embodiments, all of the interfaces tagged for the out-of-service discovery process may be shown in a user interface/window, e.g., user interface 206 (FIG. 2) for an administrator. In some embodiments, in the out-of-service discovery process, the server turns off normal service in the network and controls an unmapped interface to transmit light signals for discovery. For example, the server may turn on and off a light-emitting device, e.g., a laser, to transmit light signals. The out-of-service discovery process is autonomous but can be performed when the service is turned off in the network.

If there is no service outage following the power changes at the transmitter interface (No at 522), at 528 the server collects power readings from nodes in the network and saves the collected power readings in a storage medium. After power readings are collected at 512 or 528, at 529 the server normalizes the power settings and state of the transmitter interface. At 530 the server maps the transmitter interface with a receiver interface based on the power sequence and power readings. At 532, the server determines whether the mapping is successful. In some cases, when the receiver interface is temporarily not functioning, the server is not able to map the transmitter interface to the receiver interface. In some cases, when the power changes at the transmitter interface is performed in-service, coincidental interference may occur where the server may map the transmitter interface to two or more receiver interfaces. When the server determines that the mapping is not successful (No at 532), the server restarts the discovery process at 502 for the transmitter interface. In some embodiments, if after a predetermined number of iterations, the mapping is still unsuccessful, the server tags the transmitter interface for out-of-service discovery. When the server determines that the mapping is successful (Yes at 532), at 534 the server saves the mapping results to an interface mapping table, e.g., Table IV above.

At 536 the server determines whether there is an unmapped interface in the network that has not went through the discovery process. If the server determines that there is an unmapped interface in the network (Yes at 536), the method 500 returns to 502 to start the mapping process for the unmapped interface. If the server determines that there is no unmapped interface in the network (No at 536), at 538 the server discovers a topology for the network based on the mapping results. As such, the techniques allow interface mapping and topology discovery to be performed while the interfaces are in-service. This can reduce service down time and improve the performance of the optical network.

Figure 6:
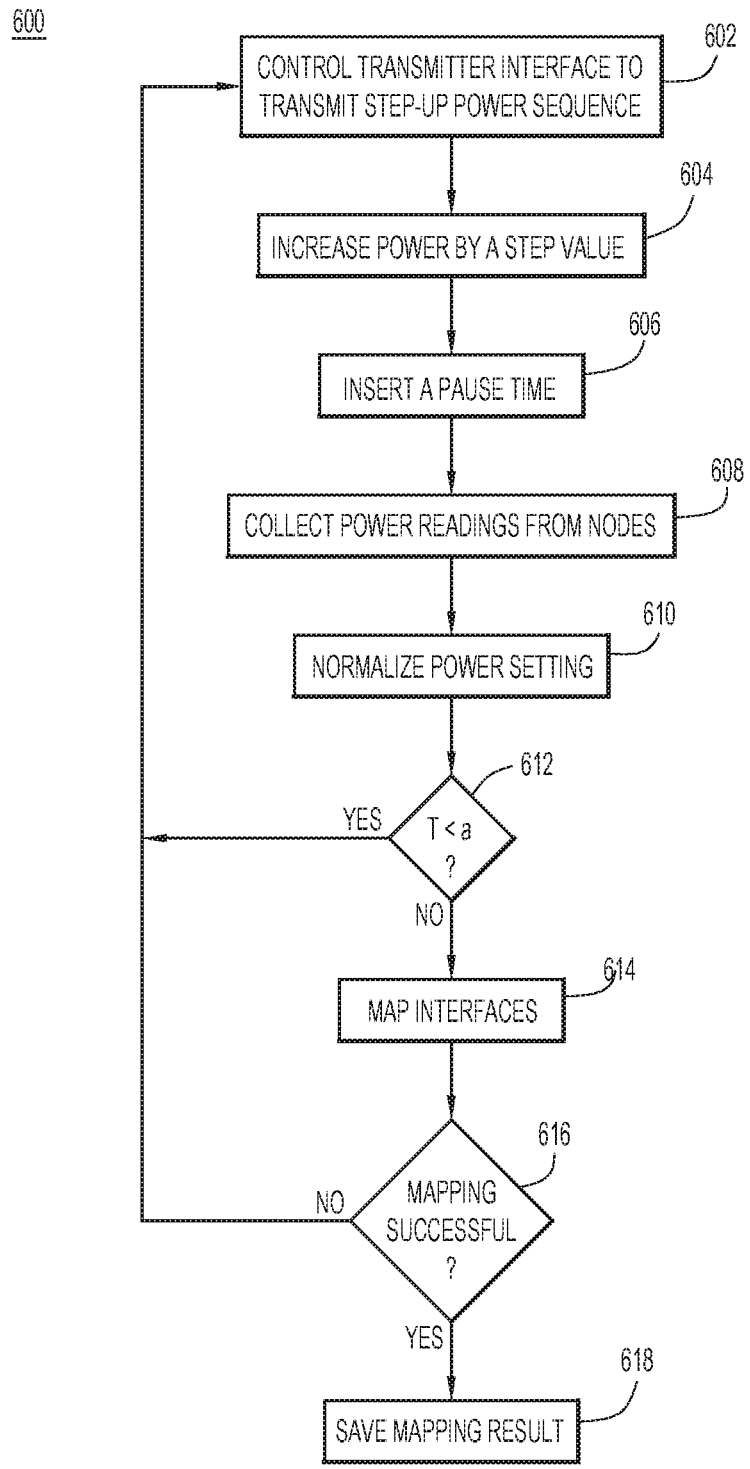
FIG. 6 is a flow chart illustrating a method performed by a server to control a transmitter interface to transmit a step-up power sequence for discovery, according to an example embodiment.

Reference is made to FIG. 6. FIG. 6 is a flow chart illustrating a method 600 performed by a server, e.g., the server 112 in FIG. 1, to control a transmitter interface to transmit a step-up power sequence for discovery, according to an example embodiment. At 602, the server controls an unmapped transmitter interface to transmit a step-up power sequence.

At 604 the server controls the transmitter interface to increase its power by the step value (power change). At 606, the server causes the transmitter interface to insert a pause time after making the power change. During the pause time, at 608 the server collects and stores power readings from nodes in the network. At 610 the server normalizes the power settings and state of the transmitter interface. To reduce the coincidental interference due to operational in-service conditions, the server is configured to iterate the operations at 602 to 610 for a number of times a. Thus, at 612 the server determines whether the current iteration T is less than some number a. In some embodiments, the number a is at least three. If the current iteration T is less than the number a (Yes at 612), the method returns to 602 for another iteration of operations 602 to 610. That is, the server causes the transmitter interface to transmit the step-up power sequence two or more times and insert a pause time between two transmissions of the step-up power sequence.

If the current iteration T reaches the number a (No at 612), at 614 the server begins to map the transmitter interface to a receiver interface. At 616, the server determines whether the mapping is successful. When the server determines that the mapping is not successful (No at 616), the server restarts the discovery process at 602 for the transmitter interface. In some embodiments, if after a predetermined number of iterations, the mapping is still unsuccessful, the server tags the transmitter interface for out-of-service discovery. When the server determines that the mapping is successful (Yes at 616), at 618 the server saves the mapping results to an interface mapping table, e.g., Table 4 above.

Figure 7:
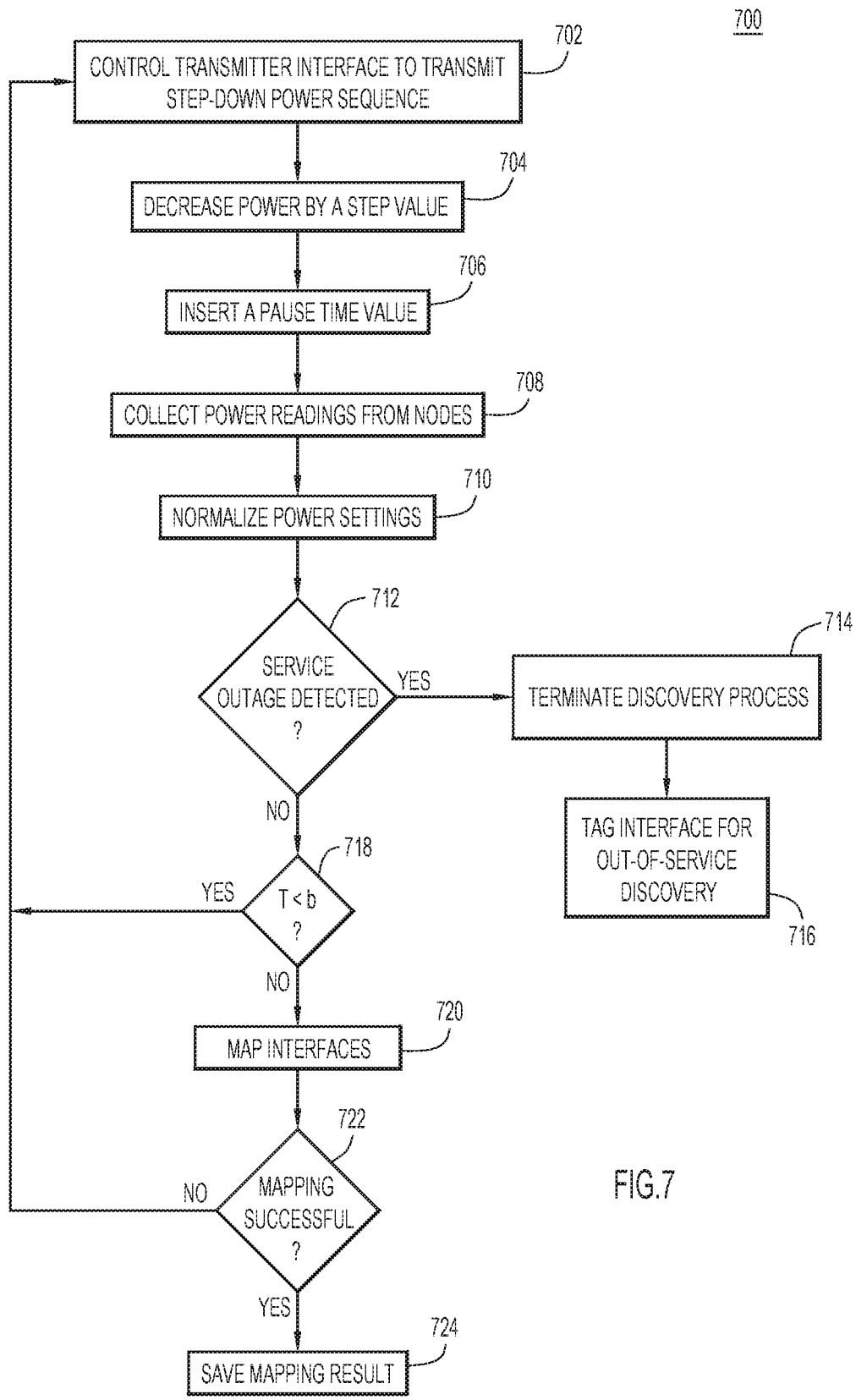
FIG. 7 is a flow chart illustrating a method performed by a server to control a transmitter interface to transmit a step-down power sequence for discovery, according to an example embodiment.

Reference is made to FIG. 7. FIG. 7 is a flow chart illustrating a method 700 performed by a server, e.g., the server 112 in FIG. 1, to control a transmitter interface to transmit a step-down power sequence for discovery, according to an example embodiment. At 702, the server controls an unmapped transmitter interface to transmit a step-down power sequence. At 704, the server controls the transmitter interface to decrease its power by a step value (power change). At 706, the server causes the transmitter interface to insert a pause time after making the power change. During the pause time, at 708 the server collects and stores power readings from nodes in the network. At 710, the server normalizes the power settings and state of the transmitter interface. At 712, the server determines whether a service outage is detected. For example, the server may detect a loss of signal on the receiver interfaces due to the power changes at the transmitter interface and determine that a service outage has occurred. In response to determining that the service outage is detected (Yes at 712), at 714, the server terminates discovery for the transmitter interface by stopping transmitting the step-down power sequence. At 716, the server tags the transmitter interface for an out-of-service discovery process.

Similar to 612 (FIG. 6), to reduce the coincidental interference due to operational in-service conditions, the server is configured to iterate the operations 702-712 for a number of times b. At 718, the server determines whether the current iteration T is less than the number b. In some embodiments, the number b is at least three. If the current iteration T is less than the number b (Yes at 718), the method 700 returns to 702 for another iteration of 702 to 712. If the current iteration T reaches the number b (No at 718), at 720 the server begins to map the transmitter interface to a receiver interface. At 722, the server determines whether the mapping is successful. When the server determines that the mapping is not successful (No at 722), the server restarts the discovery process at 702 for the transmitter interface. In some embodiments, if after a predetermined number of iterations, the mapping is still unsuccessful, the server tags the transmitter interface for out-of-service discovery. When the server determines that the mapping is successful (Yes at 722), at 724 the server saves the mapping results to an interface mapping table, e.g., Table 4 above.

Figure 8:
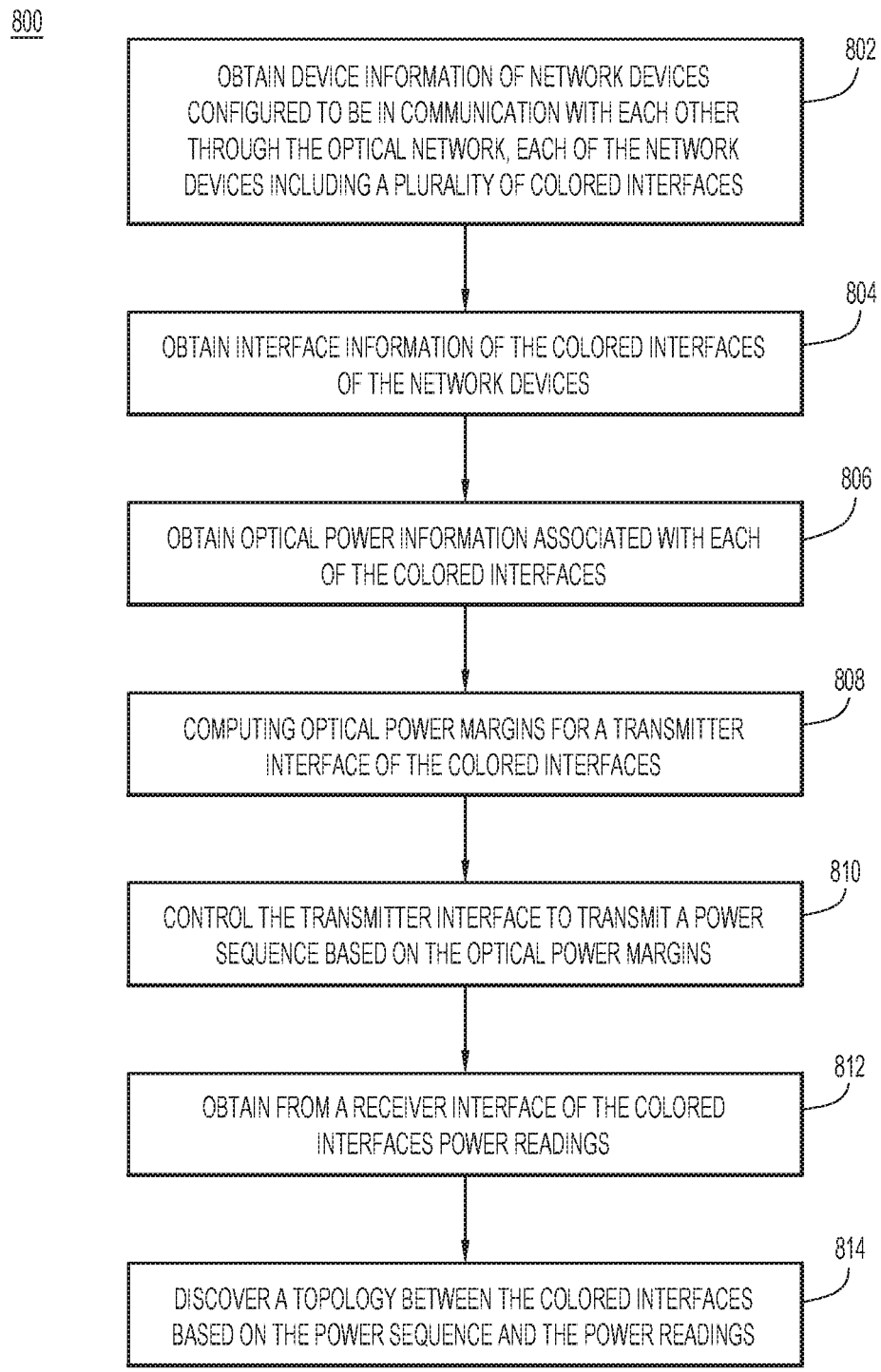
FIG. 8 is a flow chart illustrating a method for autonomously discovering topology in an optical network, according to an example embodiment.

Reference is made to FIG. 8. FIG. 8 is a flow chart illustrating a comprehensive/overall method 800 for autonomously discovering topology in an optical network, according to an example embodiment. For example, the method 800 may be performed by a server, e.g., server 112 in FIG. 1 that manages the optical network. At 802, the server obtains device information of network devices configured to be in communication with each other through the optical network. The network devices include a plurality of colored interfaces that support a range of wavelengths for communication in the optical network. For example, the server may query the devices using one or more device discovery protocols to discover or confirm device types (e.g., routers or ROADMs) and basic device information, such as the device clock or time, and hardware and software information. The server may resolve clocking conflict or inconsistence through, for example, converting the clocks of the devices to a universal time. The device information may be stored in one or more device information tables. At 804, the server obtains interface information of the colored interfaces of the network devices. For the devices discovered at 802, the server discovers interface types and states of the interfaces and generates one or more interface tables. The server identifies colored interfaces among the discovered interfaces. Further, for each colored interface, the server identifies its state.

At 806, the server obtains optical power information associated with the colored interfaces. For example, the server may obtain power readings including current power readings at the transmitter interfaces and receiver interfaces and their maximum and minimum readings from the colored interfaces on the devices discovered in 802. The obtained information populates an optical power table for the interfaces. At 808, the server computes optical power margins for a transmitter interface of the colored interfaces. To discover the topology, a power sequence is transmitted from a transmitter interface to a receiver interface in the optical network while both the transmitter interface and the receiver interface are in-service. To ensure that the topology discovery can be performed while the interfaces are in-service, the power sequence is configured such that transmitting the power sequence would not disrupt the normal operation of the transmitter interface and receiving the power sequence would not disrupt the normal operation of the receiver interface. The optical power safety margins are computed for generating a suitable power sequence for topology discovery. In some embodiments, the optical power safety margins includes a transmitter high margin: Tx-HM=Tx-High−Txc, where Tx-High is a maximum power from the transmitter interface and the Txc is a current power from the transmitter interface. In some embodiments, the optical power safety margins further includes a receiver low margin Rx-LM defined as a configurable value to enable the receiver interface to detect a signal from the power sequence. In some embodiments, the optical power safety margins further includes a transmitter power change safety margin: Tx-SM=Tx-High−(Rx Low+Rx-LM), where Rx Low is the minimum power the receiver interface can detect.

At 810, the server controls the transmitter interface to transmit a power sequence based on the optical power margins. In some embodiments, the power sequence is a step sequence having a power change step value. In some embodiments, the power sequence may be a step-up power sequence or a step-down power sequence. In some embodiments, a step value for the step power sequence may be about 0.1-1 dB or 0.1-0.5 dB, or 0.5 dB. At 812, the server obtains from a receiver interface of the colored interfaces power readings. After the transmitter interface transmits a power sequence, the server may collect power readings from the nodes in the optical network. At 814, the server discovers a topology between the colored interfaces based on the power sequence and the power readings. For example, the server may examine the power readings and determine which receiver interface receives the power sequence transmitted from the transmitter interface. The server can map the transmitter interface with a corresponding receiver interface, and record the mapping results in an interface mapping table. The server uses the mapping results to discover the topology of the optical network.

Figure 9:
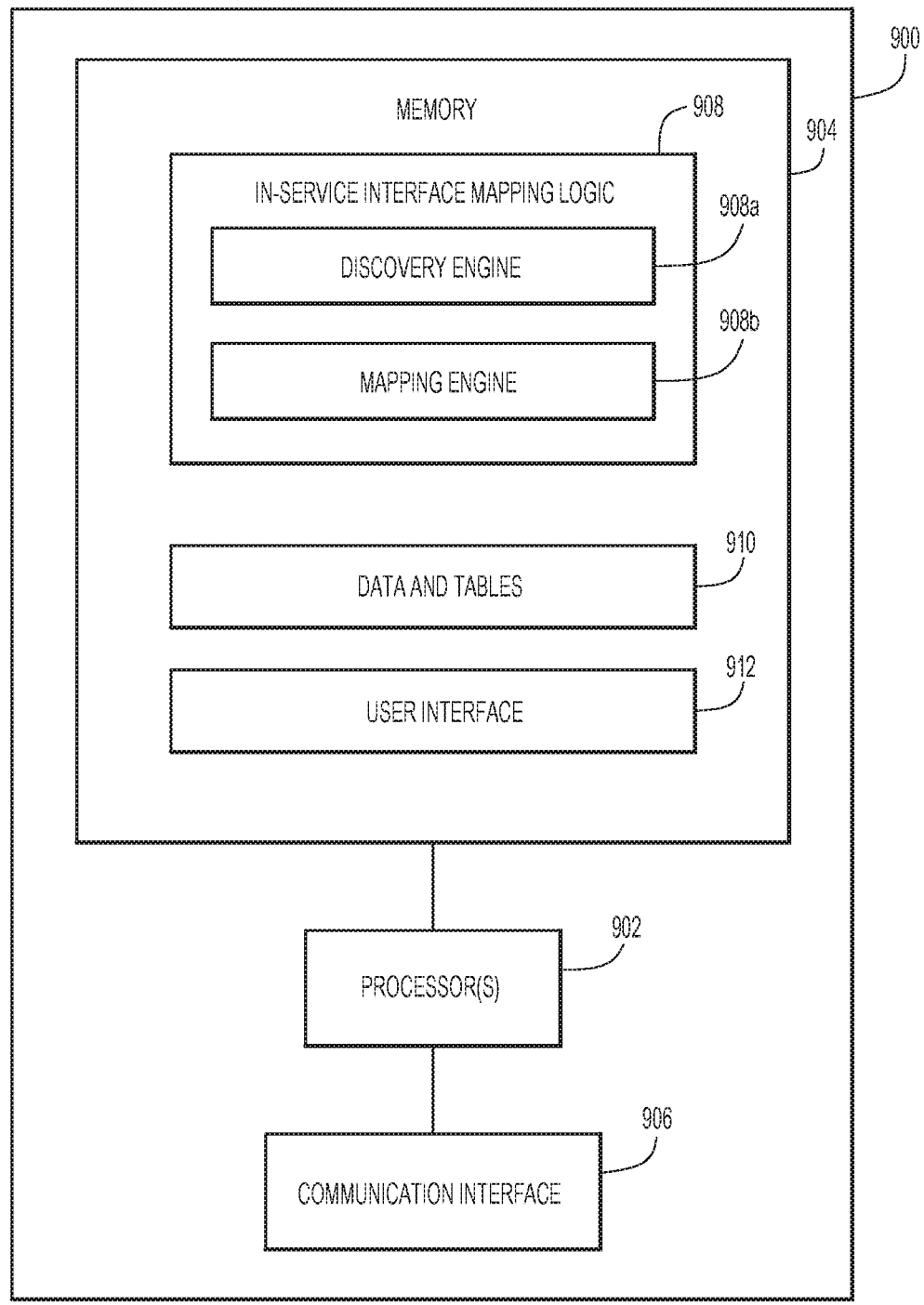
FIG. 9 depicts a block diagram of a server for discovering topology and mapping colored interfaces of network devices in an optical network, according to one example embodiment.

FIG. 9 depicts a block diagram of a server 900 for discovering topology and mapping colored interfaces of network devices in an optical network, according to one example embodiment. The server 900 can be the server/network controller 112 in FIG. 1. The server 900 includes a processor 902, a memory 904, and a communication interface 906. The processor 902 may be a microprocessor or microcontroller (or multiple instances of such components) that is configured to execute program logic instructions (i.e., software modules) for carrying out various operations and tasks described herein. For example, the processor 902 is configured to execute instructions stored in the memory 904 for the operations disclosed above.

The memory 904 may include read only memory (ROM), random access memory (RAM), magnetic disk storage media devices, optical storage media devices, flash memory devices, electrical, optical or other physical/tangible memory storage devices. The memory 904 stores instructions for in-service interface mapping logic 908 configured to resolve mapping of colored interfaces in the optical network. The in-service interface mapping logic 908 includes instructions for discovery engine 908a and for mapping engine 908b. The discovery engine 908a includes instructions for discovering device information of the devices in the optical network, discovering interface information of the devices, discovering power information associated with the interfaces, computing optical power margins for configuring a discovery power sequence, controlling transmitter interfaces to transmit discovery power sequences, and collecting power readings from the devices in the optical network. The mapping engine 908b includes instructions for mapping interfaces based on discovery power sequences configured by the discovery engine 908a and power readings collected by the discovery engine 908a. The memory 904 stores data and tables 910 generated by the in-service interface mapping logic 908 including one or more device tables, one or more interface tables, one or more power reading tables, one or more interface mapping tables, etc. The memory 904 further stores user interface 912 for presenting various windows for a user to view and manage in-service interface mapping operations described above.

The functions of the processor 902 may be implemented by logic encoded in one or more tangible (non-transitory) computer-readable storage media (e.g., embedded logic such as an application specific integrated circuit, digital signal processor instructions, software that is executed by a processor, etc.), wherein the memory 904 stores data used for the operations described herein and stores software or processor executable instructions that are executed to carry out the operations described herein.

In one embodiment, the processor 902 may be embodied by digital logic gates in a fixed or programmable digital logic integrated circuit, which digital logic gates are configured to perform storage and accessing control operations described herein. In general, in-service interface mapping logic 908 may be embodied in one or more computer-readable storage media encoded with software comprising computer executable instructions and when the software is executed operable to perform the operations described herein.

The communication interface 906 is configured to transmit communications to, and receive communications from, a computer network for the server 900. In one example, the communication interface 906 may take the form of one or more network interface cards.

The techniques presented herein allow a network controller/server to autonomously discover devices and interface mappings across the routing and optical layers without using proprietary protocols or static configurations. The techniques embody a discovery mechanism that is improved by continuous iterations through a discovery process. In some embodiments, a system defines an optical power change method and leverages an optical power change policy that can be customized by users for their own specific requirements. The discovered information can be used to build multilayer topology or pushed into routing and optical nodes for alarm correlation or leveraged by dynamic protocols to communicate interface states.

In some embodiments, the techniques enable in-service discovery by following power changing sequences that are guarded by power safety margins, to discover the interface mappings without impacting the service. Advantages of the techniques include in-service discovery without traffic impact, application to systems including devices from different vendors and platforms, and simple to implement with minor or no hardware change.

In summary, in one form, a method is provided. The method includes: obtaining, at a network controller, device information of network devices configured to be in communication with each other in an optical network, wherein the network devices include a plurality of colored interfaces that support a range of wavelengths for communication in the optical network; obtaining interface information of the colored interfaces of the network devices; obtaining optical power information associated with each of the colored interfaces; computing optical power margins for a transmitter interface of the colored interfaces; controlling the transmitter interface to transmit a power sequence based on the optical power margins; obtaining from a receiver interface of the colored interfaces power readings; and discovering a topology between the colored interfaces based on the power sequence and the power readings.

In another form, an apparatus is provided. The apparatus includes a network interface that enables network communications, a processor, and a memory to store data and instructions executable by the processor. The processor is configured to execute the instructions to: obtain device information of network devices configured to be in communication with each other in an optical network, wherein the network devices include a plurality of colored interfaces that support a range of wavelengths for communication in the optical network; obtain interface information of the colored interfaces of the network devices; obtain optical power information associated with each of the colored interfaces; compute optical power margins for a transmitter interface of the colored interfaces; control the transmitter interface to transmit a power sequence based on the optical power margins; obtain from a receiver interface of the colored interfaces power readings; and discover a topology between the colored interfaces based on the power sequence and the power readings.

In yet another form, one or more non-transitory computer-readable storage media are provided. The one or more non-transitory computer-readable storage media are encoded with software comprising computer executable instructions which, when executed by a processor, cause the processor to: obtain device information of network devices configured to be in communication with each other through an optical network, wherein the network devices include a plurality of colored interfaces that support a range of wavelengths for communication in the optical network; obtain interface information of the colored interfaces of the network devices; obtain optical power information associated with each of the colored interfaces; compute optical power margins for a transmitter interface of the colored interfaces; control the transmitter interface to transmit a power sequence based on the optical power margins; obtain from the receiver interface of the colored interfaces power readings; and discover a topology between the colored interfaces based on the power sequence and the power readings.

The above description is intended by way of example only. The present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Although the techniques are illustrated and described herein as embodied in one or more specific examples, it is nevertheless not intended to be limited to the details shown, since various modifications and structural changes may be made within the scope and range of equivalents of this disclosure.

What is claimed is:

1. A method comprising:
   obtaining, at a network controller, device information of network devices configured to be in communication with each other in an optical network, wherein the network devices include a plurality of colored interfaces that support a range of wavelengths for communication in the optical network;
   obtaining interface information of the colored interfaces of the network devices;
   obtaining optical power information associated with each of the colored interfaces;
   computing optical power margins for a transmitter interface of the colored interfaces;
   controlling the transmitter interface to transmit a power sequence based on the optical power margins;
   obtaining power readings from a receiver interface of the colored interfaces; and
   discovering a topology between the colored interfaces based on the power sequence and the power readings.

2. The method of claim 1, wherein the optical power margins include a transmitter high margin: $Tx\text{-}HM = Tx\text{-}High - Txc$, where Tx-High is a maximum power from the transmitter interface and Txc is a current power from the transmitter interface, and wherein the power sequence is a step sequence having a power change step value, the method further comprising:
   determining whether the transmitter high margin is equal to or greater than the power change step value; and
   in response to determining that the transmitter high margin is equal to or greater than the power change step value, configuring the power sequence to be a step-up power sequence.

3. The method of claim 2, wherein discovering includes discovering connectivity between interfaces of layer 3 network devices and interfaces of layer 0 network devices.

4. The method of claim 2, further comprising:
   controlling the transmitter interface to transmit the step-up power sequence two or more times; and
   inserting a pause time between two transmissions of the step-up power sequence.

5. The method of claim 2, wherein the optical power margins further includes a receiver low margin Rx-LM defined as a configurable value to enable the receiver interface to detect a signal from the power sequence, and a transmitter power change safety margin: $Tx\text{-}SM = Tx\text{-}High -$ (Rx Low+Rx-LM), where Rx Low is a minimum power the receiver interface can detect, the method further comprising:
in response to determining that the transmitter high margin is not greater than the power change step value, determining whether the transmitter power change safety margin is greater than a power change safety margin, wherein a power change within the power change safety margin does not disrupt communications between the transmitter interface and the receiver interface; and
in response to determining that the transmitter power change safety margin is greater than the power change safety margin, configuring the power sequence to be a step-down power sequence.

6. The method of claim 5, further comprising:
in response to determining that the transmitter power change safety margin is not greater than the power change safety margin, terminating the discovering.

7. The method of claim 5, further comprising:
detecting a service outage at the receiver interface while the step-down power sequence is transmitted; and
controlling the transmitter interface to stop transmitting the step-down power sequence.

8. An apparatus comprising:
a network interface that enables network communications;
a processor; and
a memory to store data and instructions executable by the processor,
wherein the processor is configured to execute the instructions to:
obtain device information of network devices configured to be in communication with each other in an optical network, wherein the network devices include a plurality of colored interfaces that support a range of wavelengths for communication in the optical network;
obtain interface information of the colored interfaces of the network devices;
obtain optical power information associated with each of the colored interfaces;
compute optical power margins for a transmitter interface of the colored interfaces;
control the transmitter interface to transmit a power sequence based on the optical power margins;
obtain power readings from a receiver interface of the colored interfaces; and
discover a topology between the colored interfaces based on the power sequence and the power readings.

9. The apparatus of claim 8, wherein the optical power margins include a transmitter high margin: Tx-HM=Tx-High−Txc, where Tx-High is a maximum power from the transmitter interface and Txc is a current power from the transmitter interface, and wherein the power sequence is a step sequence having a power change step value, wherein the processor is configured to execute the instructions to:
determine whether the transmitter high margin is equal to or greater than the power change step value; and
in response to determining that the transmitter high margin is equal to or greater than the power change step value, configure the power sequence to be a step-up power sequence.

10. The apparatus of claim 9, wherein the processor is configured to discover discovering between interfaces of layer 3 network devices and interfaces of layer 0 network devices.

11. The apparatus of claim 9, wherein the processor is configured to execute the instructions to:
control the transmitter interface to transmit the step-up power sequence two or more times; and
insert a pause time between two transmissions of the step-up power sequence.

12. The apparatus of claim 9, wherein the optical power margins further includes a receiver low margin Rx-LM defined as a configurable value to enable the receiver interface to detect a signal from the power sequence, and a transmitter power change safety margin: Tx-SM=Tx-High−(Rx Low+Rx-LM), where Rx Low is a minimum power the receiver interface can detect, wherein the processor is configured to execute the instructions to:
in response to determining that the transmitter high margin is not greater than the power change step value, determine whether the transmitter power change safety margin is greater than a power change safety margin, wherein a power change within the power change safety margin does not disrupt communications between the transmitter interface and the receiver interface; and
in response to determining that the transmitter power change safety margin is greater than the power change safety margin, configure the power sequence to be a step-down power sequence.

13. The apparatus of claim 12, wherein the processor is configured to execute the instructions to:
in response to determining that the transmitter power change safety margin is not greater than the power change safety margin, terminate discovering the topology.

14. The apparatus of claim 12, wherein the processor is configured to execute the instructions to:
detect a service outage at the receiver interface while the step-down power sequence is transmitted; and
control the transmitter interface to stop transmitting the step-down power sequence.

15. One or more non-transitory computer-readable storage media encoded with software comprising computer executable instructions which, when executed by a processor, cause the processor to:
obtain device information of network devices configured to be in communication with each other through an optical network, wherein the network devices include a plurality of colored interfaces that support a range of wavelengths for communication in the optical network;
obtain interface information of the colored interfaces of the network devices;
obtain optical power information associated with each of the colored interfaces;
compute optical power margins for a transmitter interface of the colored interfaces;
control the transmitter interface to transmit a power sequence based on the optical power margins;
obtain power readings from a receiver interface of the colored interfaces; and
discover a topology between the colored interfaces based on the power sequence and the power readings.

16. The one or more non-transitory computer-readable storage media of claim 15, wherein the optical power margins include a transmitter high margin: Tx-HM=Tx-High−Txc, where Tx-High is a maximum power from the transmitter interface and Txc is a current power from the transmitter interface, and wherein the power sequence is a step sequence having a power change step value, wherein the instructions cause the processor to:

determine whether the transmitter high margin is equal to or greater than the power change step value; and in response to determining that the transmitter high margin is equal to or greater than the power change step value, configure the power sequence to be a step-up power sequence.

17. The one or more non-transitory computer-readable storage media of claim 16, wherein the instructions cause the processor to:

control the transmitter interface to transmit the step-up power sequence two or more times; and insert a pause time between two transmissions of the step-up power sequence.

18. The one or more non-transitory computer-readable storage media of claim 16, wherein the optical power margins further includes a receiver low margin Rx-LM defined as a configurable value to enable the receiver interface to detect a signal from the power sequence, and a transmitter power change safety margin: Tx-SM=Tx-High−(Rx Low+Rx-LM), where Rx Low is a minimum power the receiver interface can detect, wherein the instructions cause the processor to:

in response to determining that the transmitter high margin is not greater than the power change step value, determine whether the transmitter power change safety margin is greater than a power change safety margin, wherein a power change within the power change safety margin does not disrupt communications between the transmitter interface and the receiver interface; and in response to determining that the transmitter power change safety margin is greater than the power change safety margin, configure the power sequence to be a step-down power sequence.

19. The one or more non-transitory computer-readable storage media of claim 18, wherein the instructions cause the processor to:

in response to determining that the transmitter power change safety margin is not greater than the power change safety margin, terminate discovering the topology.

20. The one or more non-transitory computer-readable storage media of claim 18, wherein the instructions cause the processor to:

detect a service outage at the receiver interface while the step-down power sequence is transmitted; and control the transmitter interface to stop transmitting the step-down power sequence.

* * * * *